United States Patent
Tsuchida

[19]

[11] Patent Number: 6,098,151

[45] Date of Patent: *Aug. 1, 2000

[54] CACHE MEMORY CONTROL SYSTEM THAT CACHES REQUESTED DATA AND ADJACENTLY DISPLAYED DATA

[75] Inventor: Yoshinori Tsuchida, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/763,868

[22] Filed: Dec. 11, 1996

Related U.S. Application Data

[63] Continuation of application No. 08/165,598, Dec. 13, 1993, abandoned.

[30] Foreign Application Priority Data

Dec. 14, 1992 [JP] Japan ................................. 4-332657

[51] Int. Cl.⁷ ............................................. G06F 12/12
[52] U.S. Cl. .......................... 711/133; 711/118; 711/137; 711/204; 711/217
[58] Field of Search .................................. 395/425, 375, 395/200, 460, 445, 584, 464, 412; 711/118, 133, 137, 204, 217

[56] References Cited

U.S. PATENT DOCUMENTS

| | | | |
|---|---|---|---|
| 4,445,191 | 4/1984 | York | 711/202 |
| 4,731,739 | 3/1988 | Woffinden et al. | 711/206 |
| 4,943,908 | 7/1990 | Emma et al. | 712/240 |
| 5,130,922 | 7/1992 | Liu | 711/144 |
| 5,150,472 | 9/1992 | Blank et al. | 711/137 |
| 5,163,142 | 11/1992 | Mageau | 711/142 |
| 5,233,702 | 8/1993 | Emma et al. | 711/118 |
| 5,237,694 | 8/1993 | Horne et al. | 710/200 |
| 5,293,609 | 3/1994 | Shih et al. | 711/137 |
| 5,317,716 | 5/1994 | Liu | 711/144 |
| 5,386,521 | 1/1995 | Saitoh | 712/207 |
| 5,394,537 | 2/1995 | Courts et al. | 711/202 |
| 5,784,711 | 7/1998 | Chi | 711/213 |
| 5,822,757 | 10/1998 | Chi | 711/129 |

*Primary Examiner*—B. James Peikari
*Attorney, Agent, or Firm*—Foley & Lardner

[57] ABSTRACT

A cache memory control system includes a cache memory to store a copy of a subset of data which is stored in the main memory and a cache controller to control data caching and data replacement for the cache memory. Upon a cache miss, the cache controller replaces data in the cache memory with the read requested data and a plurality of data which are adjacent to that read requested data on a display screen.

12 Claims, 9 Drawing Sheets

MAIN MEMORY ADDRESS ADJACENTLY
POSITIONED ON DISPLAY SCREEN

| (AD−XA−1) | (AD−XA) | (AD−XA+1) |
|---|---|---|
| (AD−1) | (AD) | (AD+1) |
| (AD+XA−1) | (AD+XA) | (AD+XA+1) |

100

MAIN MEMORY ADDRESS ADJACENTLY
POSITIONED ON DISPLAY SCREEN

| (AD−XA−1) | (AD−XA) | (AD−XA+1) |
|---|---|---|
| (AD−1) | (AD) | (AD+1) |
| (AD+XA−1) | (AD+XA) | (AD+XA+1) |

100

CACHE MEMORY CONTROL SYSTEM THAT CACHES REQUESTED DATA AND ADJACENTLY DISPLAYED DATA

This application is a continuation, of application Ser. No. 08/165,598, filed Dec. 13, 1993, now abandoned.

BACKGROUND OF THE INVENTION

1. Field of the Invention

The present invention relates to a cache memory control system used in a computer system and particularly relates to a cache memory control system used in a computer system specialized in graphics and image processing.

2. Description of the Related Art

FIG. 9 is a block diagram showing an example of a conventional cache memory control system.

A conventional cache memory control system used in a computer system includes, as shown in FIG. 9, a cache memory 402 to store a portion of a main memory 401 and a cache controller 403 to control the data flow for the cache memory 402. When a host processor 400 issues a data read request to the main memory 401, if that data exists in the cache memory 402 (referred to as "cache hit"), the cache controller 403 rapidly transfers the data from the cache memory 402 to the host processor 400.

If the data requested by the host processor 400 does not exist in the cache memory 402 (referred to as "cache miss"), the cache controller 403 transfers the data from the main memory 401 to the host processor 400. At the same time, the cache controller 403 transfers a continuous block of several bytes of data, including the requested data to the cache memory 402 in order to raise the probability of a cache hit for the next data read request.

For example, suppose the host processor 400 sends a read request for data 502 to the main memory 401, as shown in the FIG. 9. For a cache miss, the cache controller 403 transfers the data 502 hot only from the main memory 401 to the host processor 400 but it also transfers 16 bytes of data, from data 501 to 516 (including to data 502), as a block to the cache memory 402 for storage.

The conventional cache memory control system as described above transfers, upon a cache miss, a continuous bock of several bytes of data, including the data causing the cache miss, from the main memory to the cache memory so as to raise the cache hit ratio.

However, in a computer system for graphics and image processing, a plurality of data adjacently positioned in a display screen are located at discontinuous addresses in the main memory. Therefore, conventional cache control of replacing the data block of continuous addresses, including the one for the requested data, may cause many cache misses when the data adjacent on the display screen are sequentially read out, which may result in a lower processing speed. In other words, a computer system for graphics and image processing cannot take advantage of cache memory, which is provided for rapid data transmission.

SUMMARY OF THE INVENTION

It is an object of the present invention to provide a cache memory control system which improves the cache hit ratio in graphics and image processing by replacing an data adjacently positioned in an output area such as a display screen, for the data causing the cache miss even when they are not at addreses continuous in the main memory.

Another object of the present invention is to provide a cache memory control system which enables improved processing speed of graphic and image processing for a computer system.

According to a preferred embodiment of the present invention to attain the above objects, a cache memory control system comprises a cache memory to store a portion of data from the main memory and cache control means to control caching and replacement for the cache memory upon a read/write request to the main memory, the cache control means serving to, upon a cache miss, out the read requested data and a plurality of adjacent data positioned adjacent to the read requested data in the data output area from the main memory for replacement in the cache memory.

According to another preferred embodiment of a cache memory control system, the cache control means further comprises judgment means to judge, upon a data read request; whether the read requested data exists in the cache memory and address determination means to determine the addresses of the adjacent data in the main memory according to the address of the read requested data when the read requested data does not exist in the cache memory.

According to still another embodiment, the cache control means comprises read means to read the read requested data from the cache memory when the read requested data exists in the cache memory and storage means to store to the cache memory the read requested data and the adjacent data read from main memory, for which the addresses are determined by the address determination means.

According to a further preferred embodiment, the cache control means further comprises read means to read the read requested data from the cache memory when the read requested data exists in the cache memory and judgment means to judge whether the adjacent, for which the addresses are determined by the address determination means, are stored in the cache memory and storage means to store, to the cache memory, the read requested data and the adjacent data read from main memory, for which the addresses are determined by the address determination means and which are judged not to be in the cache memory by the judgment means.

According to another preferred embodiment, the cache control means comprises data number storage means to set and store the number of data disposed in a single horizontal row in the data output area at the output device and the address determination means for the adjacent data determines addresses of the adjacent data according to the address of the read requested data and the number of data stored in the data number storage means.

According to a still another embodiment of the present invention, a cache memory control system comprises a cache memory to store a portion of data in the main memory and cache control means to control caching and replacement for the cache memory upon a read/write request to the main memory, the cache control means comprising judgment means to judge whether the read requested data exists in the cache memory upon a data read request to the main memory, read means to read the read requested data from the cache memory when the read requested data exists in the cache memory, address determination means to determine, when the read requested data does not exist in the cache memory, the addresses of a plurality of adjacent data positioned adjacent to the read requested data in the data output area based on the address of the read requested data, judgment means to judge whether the adjacent data for which the addresses are determined by the address determination means are stored in the cache memory, and a storage means to store, to the cache memory, the read requested data and the adjacent data read from main memory for which the addresses are determined by the address determination means and which are judged not to be in the cache memory by the judgment means.

According to a further preferred embodiment, the cache control means comprises a data number storage means to set and store the number of data disposed in a single horizontal row in the data output area of the output device and for address determination means for determines addresses of the adjacent data according to the address of the read requested data and the number of data stored in the data number storage means.

According to another preferred embodiment, a cache memory control system comprises a cache memory to store a portion of data in the main memory and cache control means to control caching and replacement for the cache memory upon a read/write request to the main memory, the cache control means further comprising judgment means to judge, upon a data read request to the main memory, whether the read requested data exists in the cache memory read means to read the read requested data from the cache memory when the read requested data exists in the cache memory, and address determination means to determine, when the read requested data does not exist in the cache memory, the addresses in the main memory of a plurality of data positioned adjacent to the read requested data in the display area when the read requested data is output to the display unit based on its address.

According to still another preferred embodiment, the cache control means further comprises judgment means to judge whether the adjacent data for which the addresses are determined by the address determination means are stored in the cache memory and storage means to store, to the cache memory, the read requested data and the adjacent data read from main memory, for which the addresses are determined by the address determination means and which are judged not to be in the cache memory by the judgment means.

According to a further preferred embodiment, the cache control means further comprises data number storage means to set and store the number of data disposed in a single horizontal row in the data output area of the output device and address determination means for the adjacent data determines addresses of the adjacent data according to the address of the read requested data and the number of data stored in the data number storage means.

Other objects, features and advantages of the present invention will become clear from the detailed description given below.

BRIEF DESCRIPTION OF THE DRAWINGS

The present invention will be understood more fully from the detailed description given below and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Referring to the attached figures, a preferred embodiment of the present invention will be described below.

Figure 1:
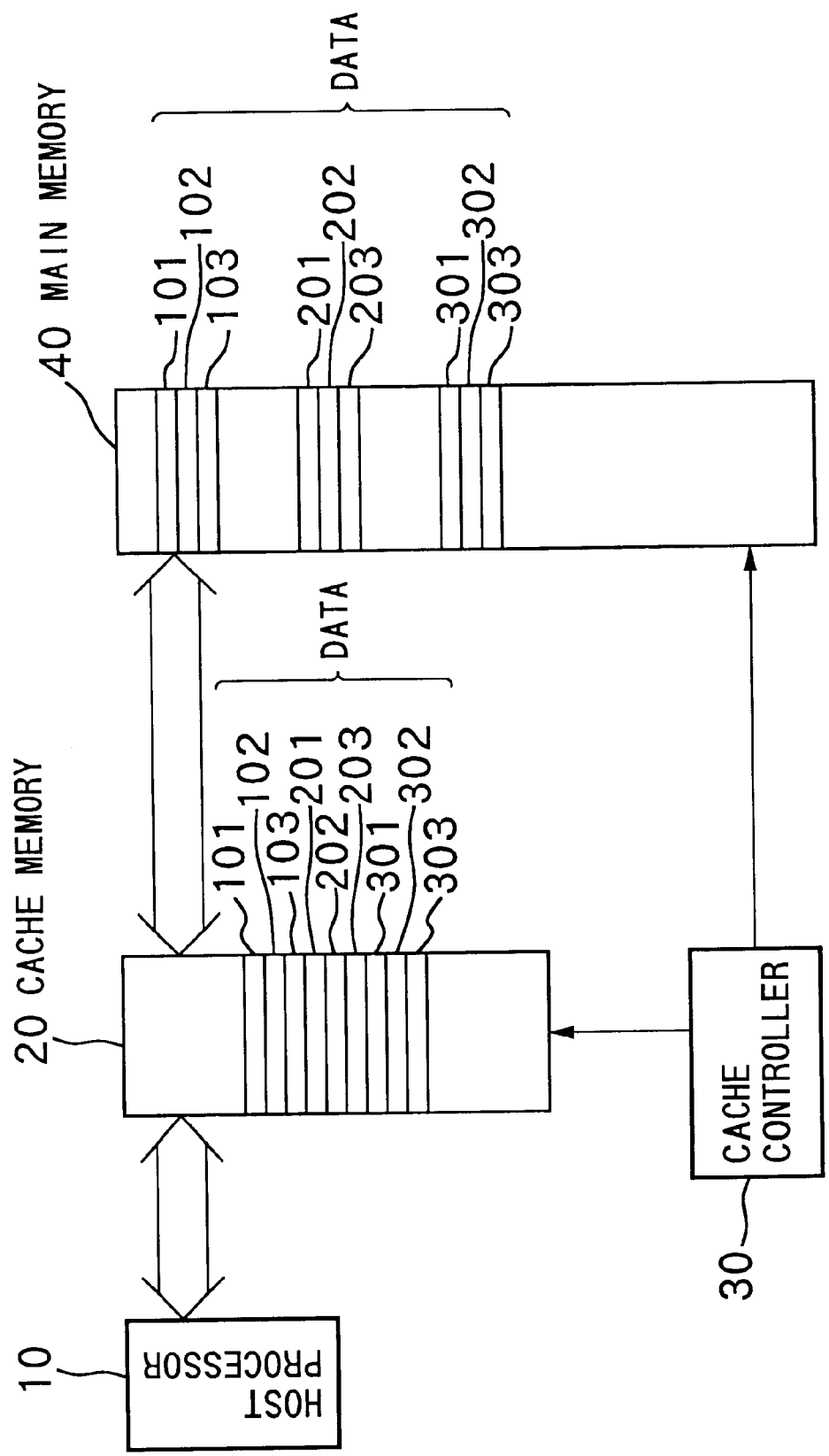
FIG. 1 is a block diagram showing the configuration of a cache memory control system according to a preferred embodiment of the present invention.

FIG. 1 is a block diagram showing a preferred embodiment of a cache memory control system according to the present invention. In the figure, a cache memory control system of the present invention comprises a cache memory 20 which, when a host processor 10 accesses a main memory 40, performs caching for the main memory 40, and a cache controller 30 which controls caching, replacement and data input/output for the cache memory 20.

The cache memory 20 stores a portion of data stored in the main memory 40. The data flow related to the cache memory 20 is controlled by the cache controller 30. Upon a read request for data by the host processor 10 to the main memory 40, the cache controller 30 reads out the data from the cache memory 20 and immediately transfers the data to the host processor 10 without accessing the main memory 40 when the requested data exists in the cache memory 20 (this is referred to as "caching" of the cache memory 20).

Figure 2:
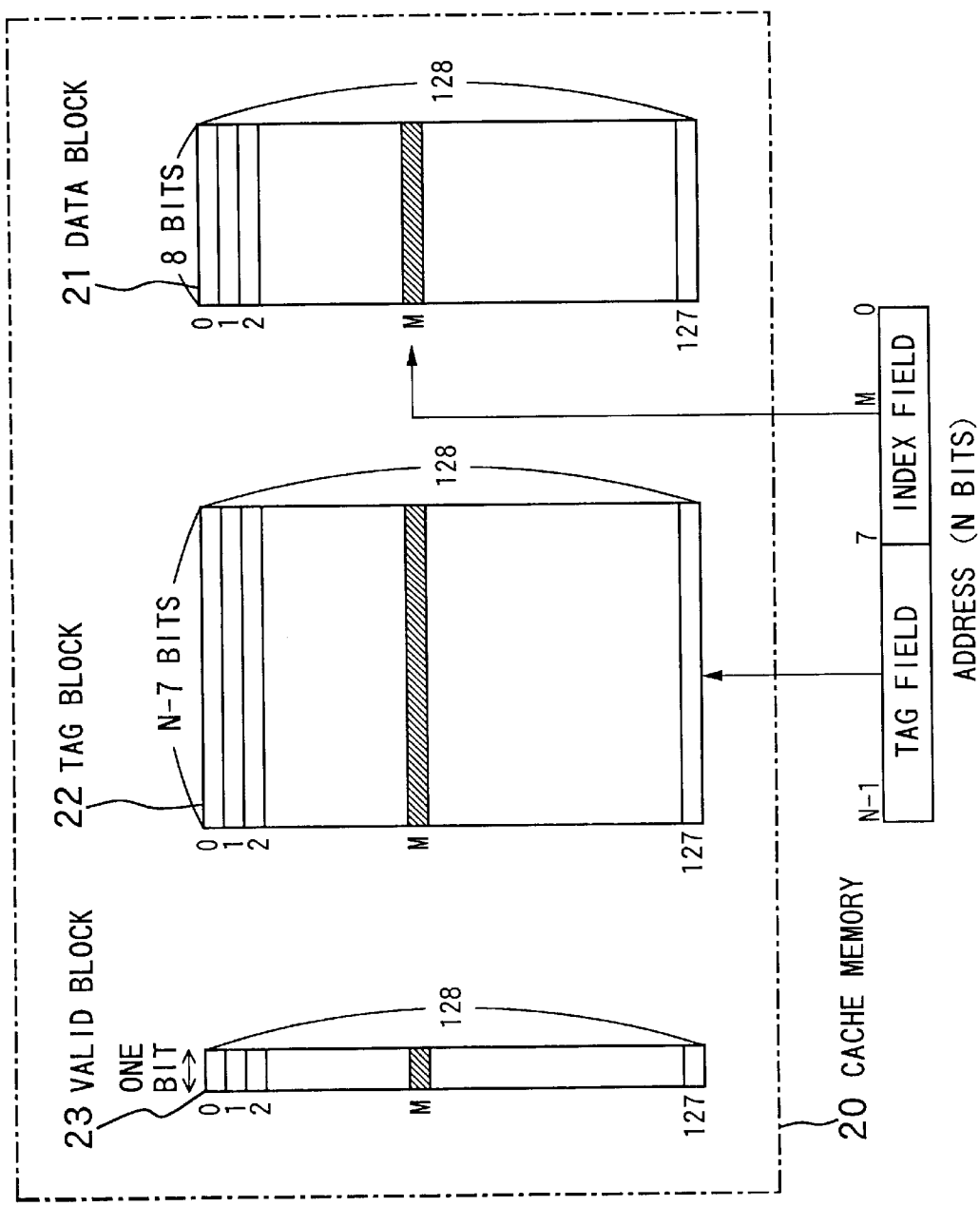
FIG. 2 is a block diagram showing the configuration of a cache memory for the cache memory control system of FIG. 1.

FIG. 2 shows the configuration of the cache memory 20. The cache memory 20 comprises a data block 21, a tag block 22 and a valid block 23. Among N bits of data that are sent as the address upon with a data read request from the host processor 10, the lower seven bits (Bit 0 to Bit 6) are used as the index field. The index field specifies the memory area to be used in each block. In the address of N bits, the higher N−7 bits (Bit 7 to Bit N−1) are treated as the tag field. The tag field is stored in the tag block 22, or is compared with a tag field already stored in the tag block 22.

The data block 21 is a memory domain that stores the data read out of the main memory 40. In the figure, the data block 21 has 128 memory areas, each of which has eight bits (8 bits×128). The tag block 22 is a memory domain that stores the tag field of N-bit addresses. In the figure, the tag block 22 has 128 memory areas of N−7 bits (N−7 bits×128). The valid block 23 is a domain that contains the validity of the cache data stored in the data block 21. In the figure, the valid block 23 has 128 memory areas of one bit (one bit×128). When the valid block 23 has a logical value "1" at a memory area M, for example, it means that the data at memory area M in the data block 21 is valid, and when it has a logical value 0 there, it means that the data stored at the memory area M in the data block 21 is invalid. At the time of system reset, all memory areas in the valid block 23 are provided with a "0".

Figure 3:
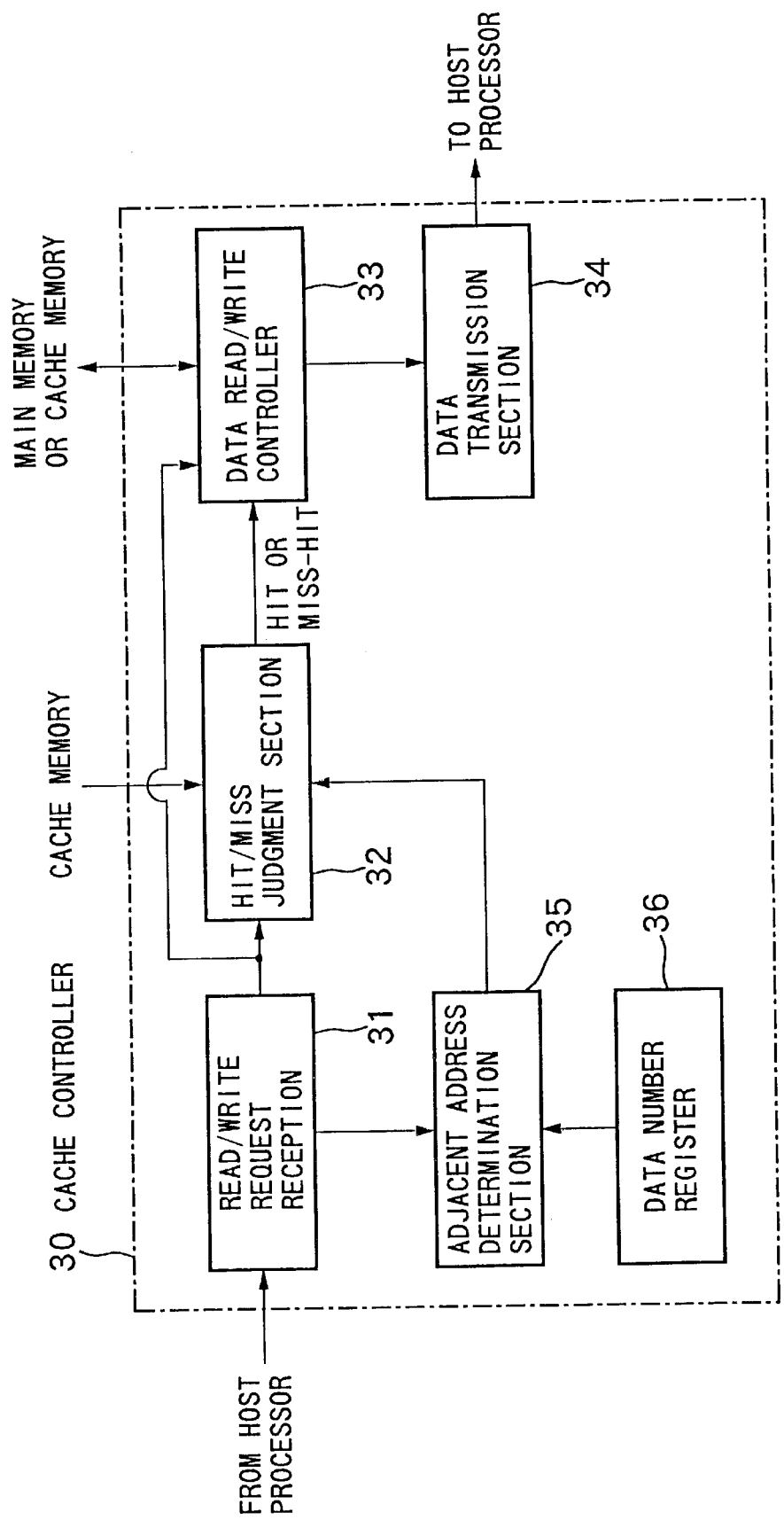
FIG. 3 is a block diagram showing the configuration of a cache controller in the cache memory control system of FIG. 1.

FIG. 3 is a functional block diagram showing the configuration of the cache controller 30. The cache controller 30 comprises a read/write request reception section 31, a hit/miss judgment section 32, a data read/write controller 33, a data transmission section 34, an adjacent address determination section 35 and a data number register 36.

The read/write request reception section 31 receives data read/write requests from the host processor 10 to the main memory 40. The hit/miss judgment section 32 judges, when the host processor 10 sends a data read request, whether or not the specified data exists in the cache memory 20 according to the address of the specified data. The data read/write controller 33 executes data writes to the main memory 40 and the cache memory 20, and executes data lads from the main memory 40 and the cache memory 20. The data transmission section 34 transfers the data read out of the cache memory 20 or the main memory 40 to the host processor 10.

The adjacent address determination section 35 determines, when the hit/miss judgment section 32 judges that the specified data does not exist in the cache memory 20 (miss), addresses of the adjacent data according to the address of the specified data causing the miss-hit. The data number register 36 is a register to store the number of data horizontally disposed on the display screen of the display unit to display the data read out of the cache memory 20 or the main memory 40. The number of data horizontally disposed on the display screen is set using software corresponding to the display unit.

Figure 4:
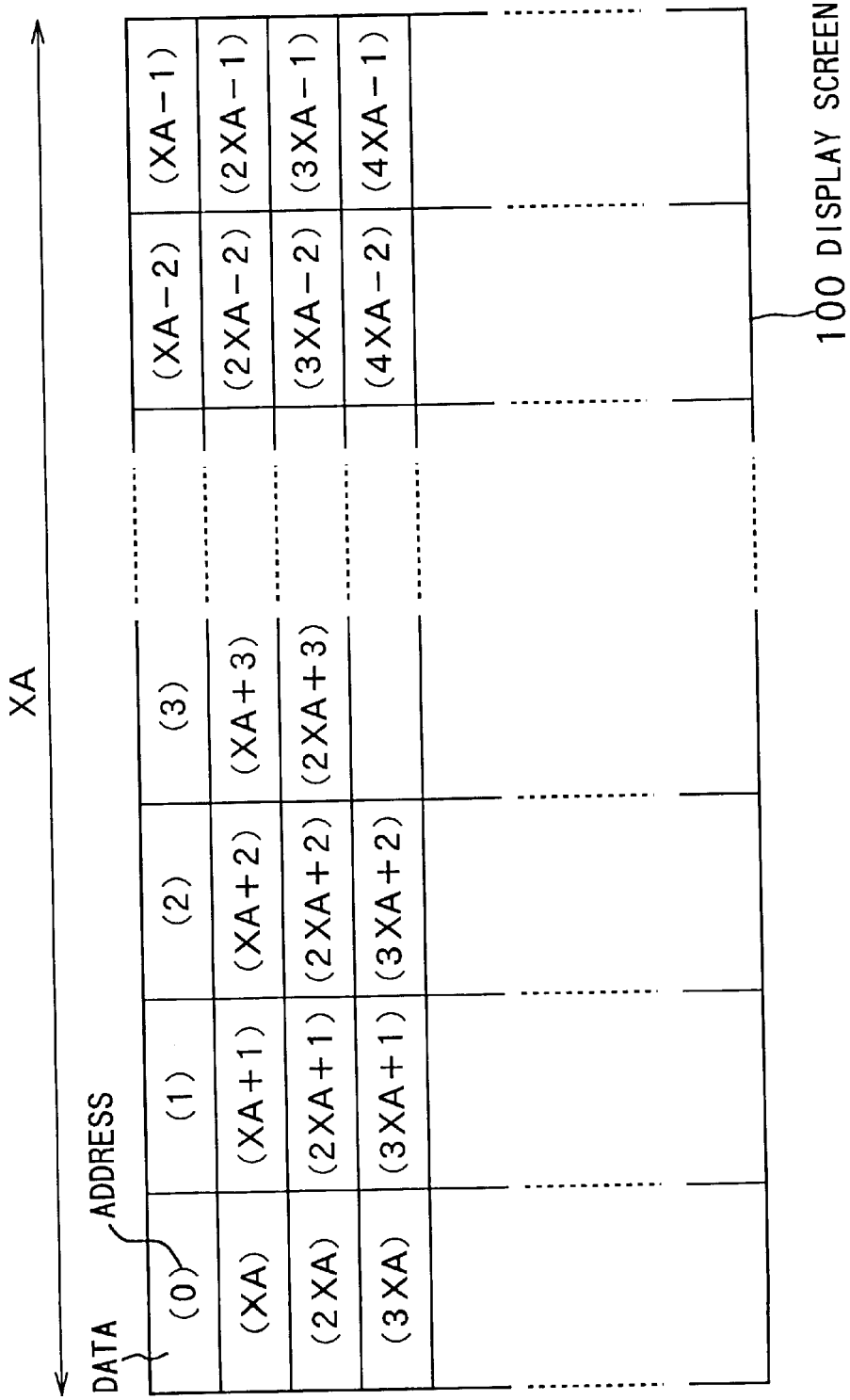
FIG. 4 is an explanatory view showing the relation between the data displayed on screen and the addresses in the main memory.

FIG. 4 shows the relation between the data displayed on screen and the addresses in the main memory 40. As shown in the figure, when XA graphic data are displayed in a single horizontal row on the display screen 100, the addresses for the data displayed on the display screen 100 are as shown in FIG. 4 in the main memory 40. It is supposed here that the main memory has a space of one place configuration.

Figure 5:
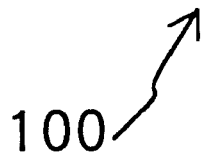
FIG. 5 is an explanatory view showing addresses in the main memory for the data adjacent to particular data on screen.

In this case, if the graphic data with the address AD in the main memory 40 is specified, the addresses of the graphic data around (i.e. above and below, left and right sides of, upper right, upper left, lower right and lower left of) the data of address AD displayed on screen can be determined as shown in FIG. 5.

Referring next to the flowcharts of FIGS. 6 and 7, the operation of the cache controller 30 in a cache memory control system with the above configuration will be described below. The processes of FIGS. 6 and 7 are realized by the hardware of the cache controller 30.

Figure 6:
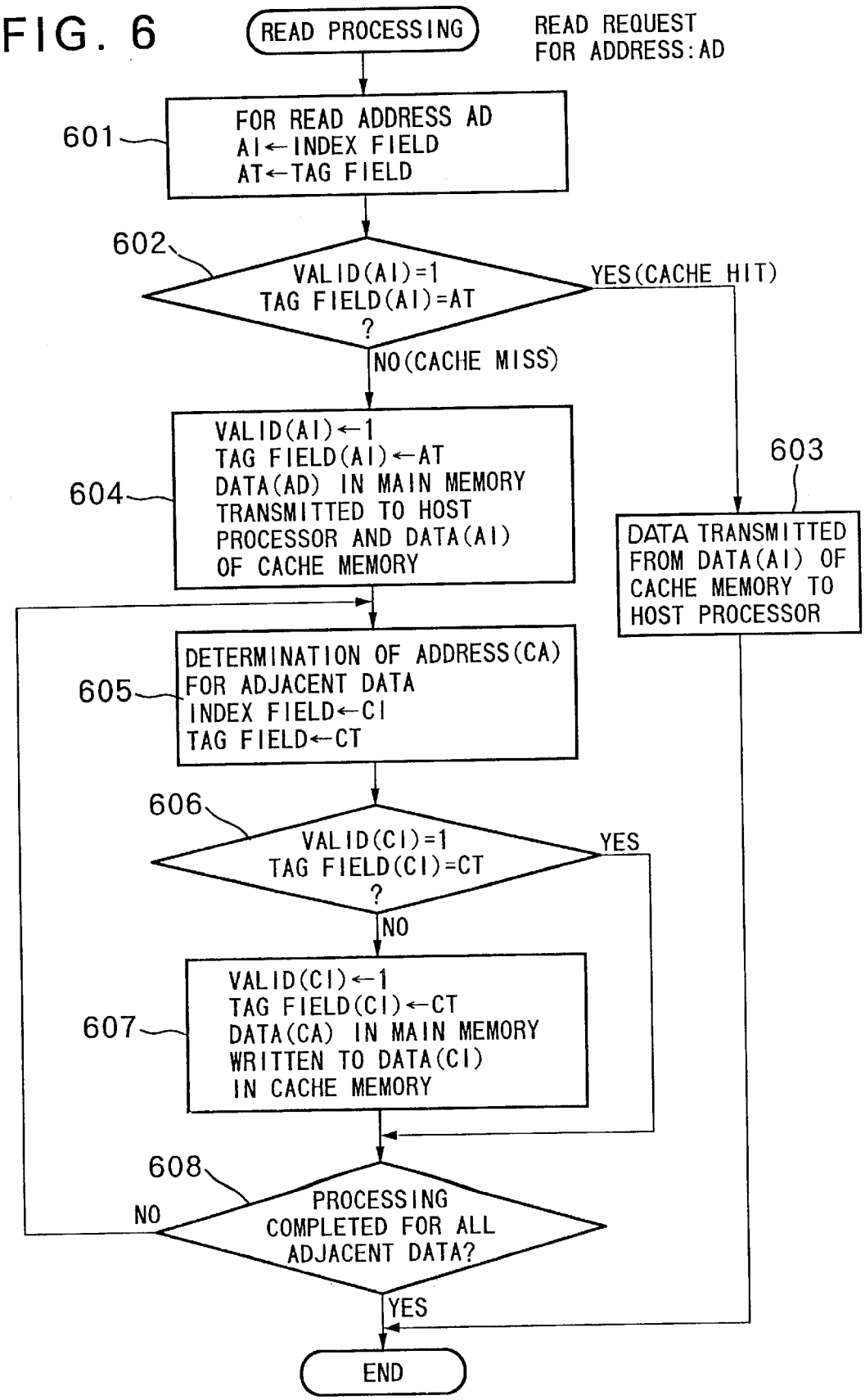
FIG. 6 is a flowchart that illustrates the procedure when the host processor issues a data read request to the main memory.
Figure 7:
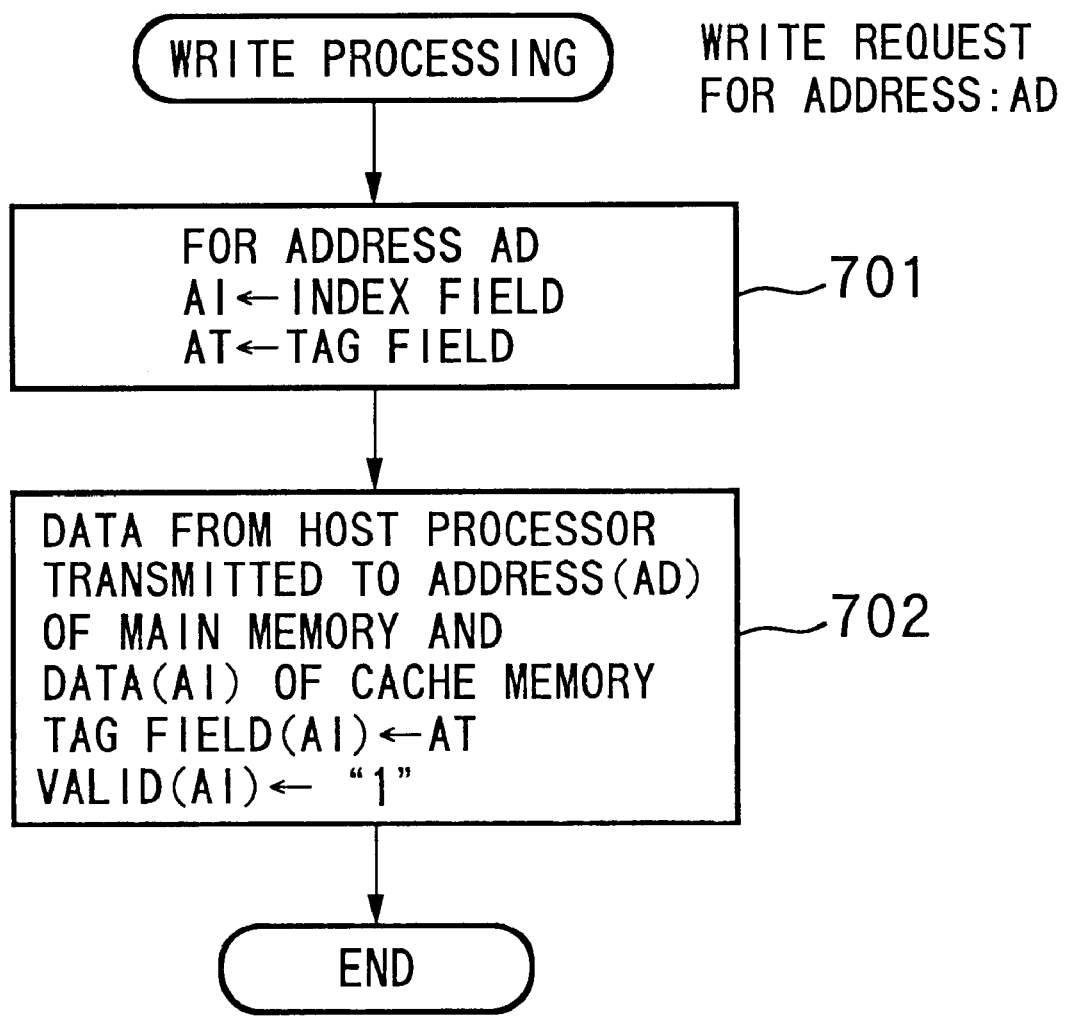
FIG. 7 is a flowchart that illustrates the procedure when the host processor issues a data write request to the main memory.

Referring to FIG. 6, a data read request from the host processor 10 to the main memory 40 is processed as described below.

When the host processor 10 sends to the main memory 40 a request to read the graphic data of address AD, the read request is received by the read/write request reception section 31 and the index field and the tag field of the address AD are read (Step 601). It is supposed here that the index field of the address AD is AI and the tag field is AT. Next, the hit/miss judgment section 32 judges whether the tag field (AI), which is the memory area AI of the tag block 22 in the cache memory 20, has the same content as AT and VALID (AI), which is the memory area AI of the valid block 23 has "1" (Step 602).

If the answer is "Yes" (i.e. a cache hit) in Step 602, a cache hit signal is output to the data read/write controller 33, which reads out the graphic data stored in DATA (AI), the memory area AI of the data block 21 in the cache memory 20, so that the data read out is transmitted to the host processor 10 by the data transmission section 34 (Step 603).

If the answer is "No" (i.e. a cache miss) in Step 602, i.e. a cache miss signal is output to the read/write controller 33. The data read/write controller 33 writes "1" to VALID (AI), which is the memory area AI in the valid block 23, writes AT to the tag field (AI), which is the memory area AI of the tag block 22, and writes the data at the address AD read out of the main memory 40 to DATA (AI), which is the memory area AI of the data block 21. It further transmits the data in the main memory 40 to the host processor 10 via the data transmission section 34 (Step 604). In other words, it reads out the data from the main memory 40 and causes replacement at the cache memory 20.

Next, when the graphic data DATA (AD) with the address AD is displayed on the display screen of the display unit, the addresses of the graphic data displayed around the data with the address AD requested by the read request on the display screen (hereinafter referred to as "adjacent data") are determined by the adjacent address determination section 35 (Step 605).

Data in the display screen, for which the addresses are determined upon a read request, are to be determined in advance. For example, in the case of FIG. 5, upon a read request for the graphic data with the address AD, addresses of eight adjacent data (above and below, left and right sides of, upper right, upper left, lower right and lower left of the data of address AD) are determined. The address determination for adjacent data is made according to the address specified by the read request data and the number of data horizontally disposed on the display screen that is stored in the data number register 36. In FIG. 5, the address of the read request data is AD and the number of data in the horizontal direction on screen is XA. Accordingly, the address of the adjacent data positioned at the upper right of the requested data can be determined as AD−XA+1 and the address of the adjacent data positioned at the lower left can be determined as AD+XA−1. The number of adjacent data to be replaced can be set arbitrarily.

The addresses of the adjacent data are determined for each place of data. When the address CA for the adjacent data is determined, the index field and the tag field for the address CA are read. It is supposed here that the index field is CI and the tag field is CT for the address CA.

Next, the hit/miss judgment section 32 judges whether the tag field (CI), the memory area CI of the tag block 22 in the cache memory 20, has the same content as CT, and whether VALID (CI), the memory area CI of the valid block 23, has a "1" (Step 606).

If the answer is "Yes" in Step 606, it means that the adjacent data corresponding to DATA (CI), which is the memory area CI of the data block 21 in the cache memory 20, is already stored. In this case, the adjacent data is not replaced (written from the main memory 40 to the cache memory 20) and the system returns to the next adjacent data address determination.

If the answer is "No" in Step 606, the data read/write controller 33 writes "1" to VALID (CI), the memory area CI of the valid block 23, writes CT to the tag field (CI), the memory area CI of the tag block 22, reads out the adjacent data for the address CA in the main memory 40, and writes the read out data to the DATA (CI), the memory area CI of the data block 21, in the cache memory 20 (Step 607).

The above procedure is repeated for all adjacent data until address determination and replacement are completed (Step 608).

Referring now to FIG. 7, the procedure for a data write request from the host processor 10 to the main memory 40 is described. This system writes data according to the so-called "write through" method.

Upon request from the host processor 10 to write graphic data to address AD of the main memory 40, the write request is received at the read/write request reception section 31, and the index field and tag field for the address AD are read (Step 701). It is supposed here that the index field is AI and that the tag field is AT for the address AD.

Then, the data read/write controller 33 writes the data sent from the host processor 10 to the address AD in the main memory 40. It also writes the data sent from the host processor 10 to DATA (AI), the memory area AI of the data block 21 in the cache memory 20, writes "1" to VALID (AI), the memory area AI in the valid block 23, and writes "AT" to the tag field (AI), the memory area AI of the tag block 22 (Step 702). Thus, writing to the main memory 40 and replacement of cache memory 20 are completed.

Figure 8:
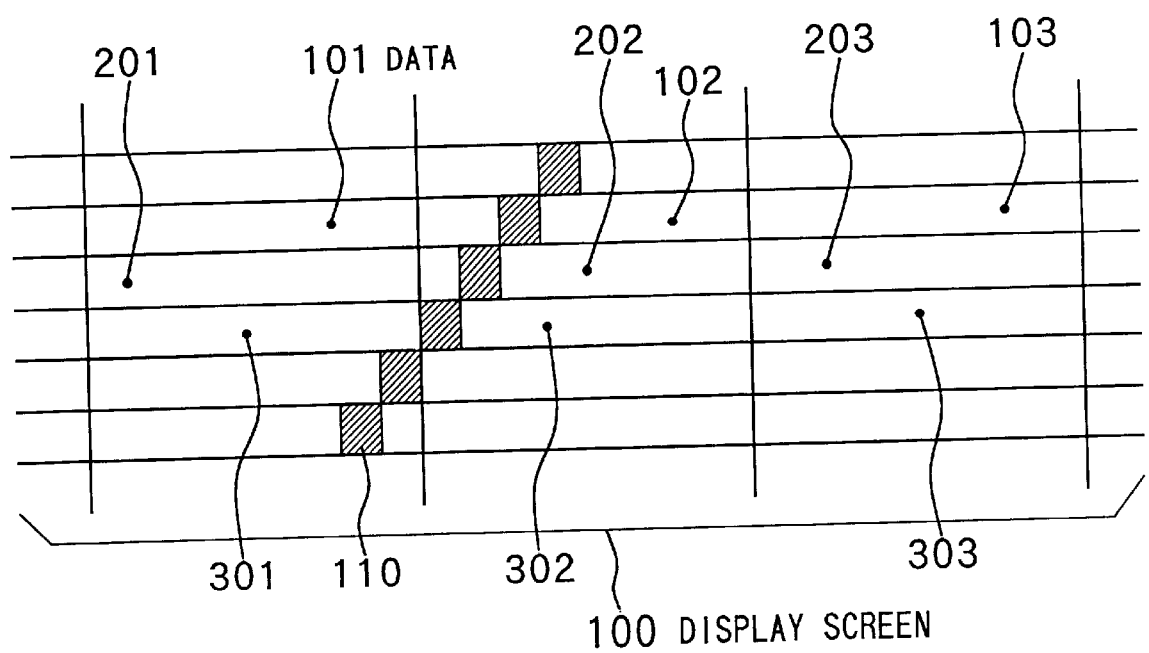
FIG. 8 is an explanatory view that illustrates the operation of the cache memory control system in drawing an oblique line on the display screen and FIG. 9 is a block diagram to showing the configuration of a conventional cache control system and its cache operation.
Figure 9:
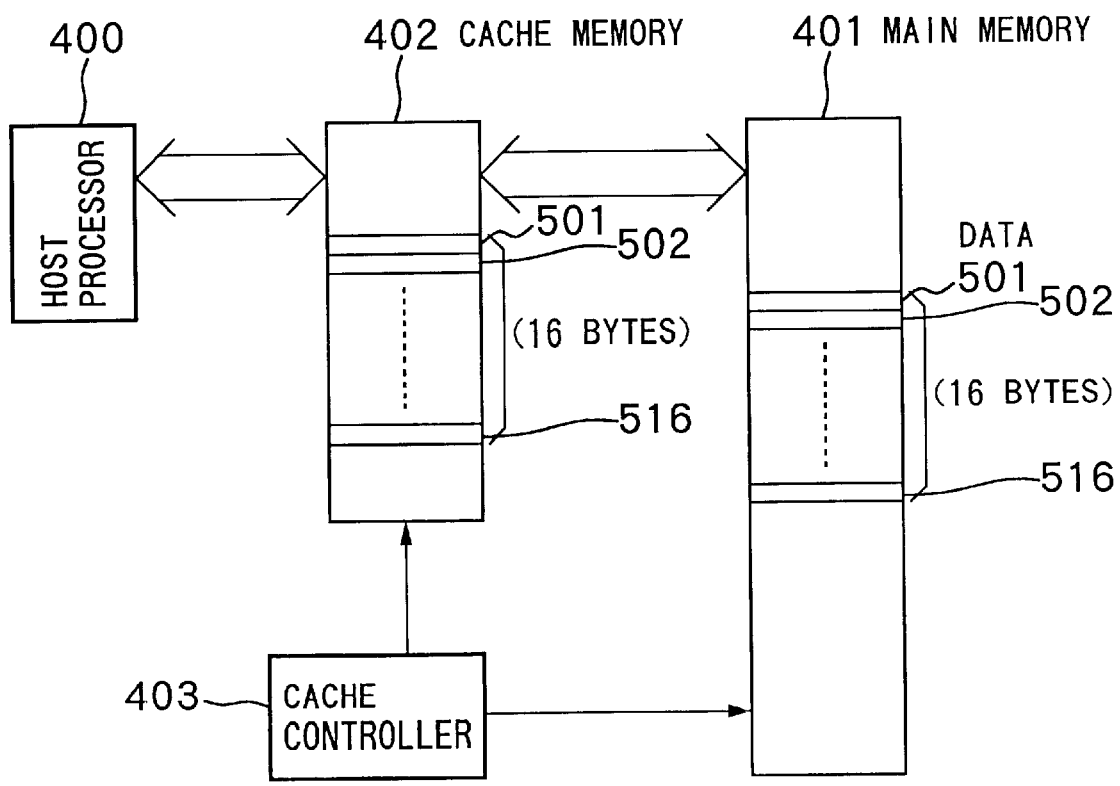

Given below is a specific example shown in FIG. 8, where an oblique line 110 is drawn on the display screen by reading out the data 101 to 103, 201 to 203 and 301 to 303, which are stored in the main memory 40 as shown in FIG. 1 as the graphic data for drawing the oblique line 110 on the image display screen 100. Here, data 101 to 103 are stored at continuous addresses in the main memory 40. Data 201 to 203 and data 301 to 303 are also stored at continuous addresses. However, data 101 to 103 and data 201 to 203 are not continuous to one another in the main memory 40. Data to 103 and 301 and 303, and data 201 to 203 and data 301 to 303 are also discontinuous to one another.

The cache memory control system operates as follows when drawing the oblique line 110 on the display screen 100. Note that the oblique line 110 is, when being drawn, formed on the display screen 100 starting from the reading of the lower left data.

When the host processor 10 sends a read request for data 202 to the main memory 40, the cache controller 30 judges whether the data 202 is in the cache memory 20. For a cache hit, it rapidly transfers data 202 from the cache memory 20 to the host processor 10. For a cache miss, however, it transfers data 202 from the main memory 40 to the host processor 10 and at the same time stores data 202 in the cache memory 20 (replacement). At the same time, the addresses of the eight data to be displayed adjacent to data 202 on the display screen 100, which are labeled 101 to 103, 201, 203 and 301 to 303, are determined so that these data are transferred from the main memory 40 to the cache memory 20 for storage.

Thereafter, the host processor 10 processes and writes the result to the cache memory 20 and the main memory 40.

After replacement at the cache memory 20 as described above upon a cache miss for data 202, the host processor 10 sends a read request for data 102 at the upper right of the data 202 on the display screen. Since data 102 is in the cache memory 20 because of the above descubed replacement, it causes a cache hit and data 102 does not have to be read out of the main memory 40, but rather is transferred from the cache memory 20 to the host processor 10 rapidly. The host processor 10 processes for data 102 and writes the result to the cache memory 20 and the main memory 40. By repeating such processing, the oblique line 110 is drawn.

The cache memory control system of the present invention stores, upon a cache miss, the data which are discontinuous in the main memory but adjacent to the data causing the cache miss on the display screen and thereby improves the cache hit ratio for graphics and image processing. Therefore, the processing speed of graphics and image processing in the computer system can be improved.

Though the above example explains the case where the graphic data for drawing on the display screen are read out by means of the cache memory, the present invention is also applicable to other data reading for output of graphic data to a certain output area by means of output devices such as a plotter and a printer. In this case, the number of data disposed in a single row in horizontal direction of the data output area is set at the data number register.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above, but rather, should be understood to include all possible embodiments which can be embodied within a scope encompassed and equivalents thereof with respect to the features set out in the appended claims.

What is claimed is:

1. A cache memory control system comprising:

a cache memory for storing a copy of a subset of data which is stored in a main memory, and cache control means for controlling data caching and data replacement for said cache memory upon a read request to said main memory, said cache control means for, when data requested by said read request for data to be output to an output device does not exist in said cache memory, reading out from said main memory said read requested data and only a plurality of predetermined adjacent data for replacement in said cache memory without reading out unnecessary data, wherein the plurality of said predetermined adjacent data are positioned on an output area of the output device at a position above said read requested data, a position below said read requested data, a position to a left side of said read requested data, a position to a right side of said read requested data, an upper right side of said read requested data, an upper left side of said read requested data, a lower right side of said read requested data, and a lower left side of said read requested data, and wherein said predetermined adjacent data is determined independent of paging considerations.

2. A cache memory control system as set forth in claim 1, wherein said cache control means further comprises:

first judgment means for judging whether said read requested data exists in said cache memory upon a data read request to said main memory, and address determination means for determining addresses of said adjacent data in said main memory based on an address of said read requested data when said read requested data has been judged not to exist in said cache memory by said first judgment means.

3. A cache memory control system as set forth in claim 2, wherein said cache control means further comprises:

read means for reading said read requested data from said cache memory when said read requested data has been judged to exist in said cache memory by said first judgment means, and storage means for storing to the cache memory said read requested data and said adjacent data.

4. A cache memory control system as set forth in claim 2, wherein said cache control means further comprises:

read means for reading said read requested data from said cache memory when said read requested data has been judged to exist in said cache memory by said first judgment means, second judgment means for judging whether said adjacent data exist in said cache memory, and storage means for storing, to said cache memory, said read requested data and said adjacent data which have been judged by said first and second judgment means not to exist in said cache memory.

5. A cache memory control system as set forth in claim 2, wherein said cache control means further comprises:

data number storage means for setting and storing an indicator of an amount of data disposed in a single horizontal row in the output area of the output device, and wherein said address determination means determines addresses in said main memory of said adjacent data based on the address of said read requested data and the indicator stored in said data number storage means.

6. A cache memory control system comprising:

a cache memory for storing a copy of a subset of data which is stored in a main memory; and cache control means for controlling data caching and data replacement for said cache memory upon a read request to said main memory for data to be output to an output device, said cache control means further comprising first judgment means for judging whether said read requested data exists in said cache memory upon a data read request to said main memory, read means for reading said read requested data from said cache memory when said read requested data has been judged to exist in said cache memory by said first judgment means, address determination means for determining, when said read requested data has been judged not to exist in said cache memory by said first judgment means, addresses of only a plurality of predetermined adjacent data positioned on an output area of the output device at a position above said read requested data, a position below said read requested data, a position to a left side of said read requested data, a position to a right side of said read requested data, an upper right side of said read requested data, an upper left side of said read requested data, a lower right side of said read requested data, and a lower left side of said read requested data in a data output area of a data output device based on an address of said read requested data, second judgment means for judging whether said predetermined adjacent data exist in said cache memory, and storage means for storing, to said cache memory, said read requested data and said predetermined adjacent data which have been judged by said first and second judgment means not to exist in said cache memory, wherein said predetermined adjacent data is determined independent of paging considerations.

7. A cache memory control system as set forth in claim 6, wherein said cache control means further comprises:

data number storage means for setting and storing an indicator of an amount of data disposed in a single horizontal row in the data output area of the data output device, and wherein said address determination means determines addresses in said main memory of said adjacent data based on the address of said read requested data and the indicator stored in said data number storage means.

8. A cache memory control system comprising:

a cache memory for storing a copy of a subset of data which is stored in a main memory, and cache control means for controlling data caching and data replacement for said cache memory upon a read request to said main memory for data to be output to an output device, said cache control means further comprising first judgment means for judging whether said read requested data exists in said cache memory upon a data read request to said main memory, read means for reading said read requested data from said cache memory when said read requested data has been judged to exist in said cache memory by said first judgment means, and address determination means for determining, when said read requested data has been judged not to exist in said cache memory by said first judgment means, addresses in said main memory of only a plurality of adjacent data positioned on an output area of the output device at a position above said read requested data, a position below said read requested data, a position to a left side of said read requested data, a position to a right side of said read requested data, an upper right side of said read requested data, an upper left side of said read requested data, a lower right side of said read requested data, and a lower left side of said read requested data in a display area of a display unit according to an address of said read requested data, and wherein the plurality of adjacent data is determined independent of paging considerations.

9. A cache memory control system as set forth in claim 8, wherein said cache control means further comprises:

second judgment means for judging whether the plurality of data exist in said cache memory, and storage means for storing, to said cache memory, said read requested data and said plurality of data which have been judged by said first and second judgement means not to exist in the cache memory.

10. A cache memory control system as set forth in claim 8, wherein said cache control means further comprises:

data number storage means for setting and storing an indicator of an amount of data disposed in a single horizontal row in the display area of the display unit, and wherein said address determination means determines addresses in said main memory of said adjacent data based on the address of said read requested data and the indicator stored in said data number storage means.

11. A cache memory control system comprising:

a main memory that stores data;

a cache memory that stores a copy of a subset of said data stored in said main memory; and a cache controller that controls data caching and data replacement for said cache memory upon a read request to said main memory for data to be output to an output device, wherein when data requested by said read request does not exist in said cache memory, said cache controller reads out from said main memory said data requested by said read request for replacement in said cache memory, and wherein said cache controller further reads out from said main memory only a plurality of predetermined adjacent data that are positioned adjacent to said data requested by said read request in an output area of the output device, wherein said adjacent data is determined independent of paging considerations.

12. A Cache Memory Control System as set forth in claim 1, wherein the plurality of predetermined adjacent data represent pixel locations and values on the output area of the output device.

* * * * *